United States Patent [19]

Rodgers et al.

[11] Patent Number: 4,800,465

[45] Date of Patent: Jan. 24, 1989

[54] FUSE PANEL MOUNTING PLATE

[76] Inventors: E. Walter Rodgers, 5650 W. Marconi, Glendale, Ariz. 85036; Lenual E. Rodgers, Jr., 1434 W. Pershing, Phoenix, Ariz. 85029

[21] Appl. No.: 80,446

[22] Filed: Jul. 31, 1987

[51] Int. Cl.$^4$ ............................................. H02B 1/18
[52] U.S. Cl. ...................................... 361/432; 211/26; 361/417; 361/419; 361/428; 361/429
[58] Field of Search ................. 211/26, 69, 69.1, 70.6; 248/110; 361/349, 417–420, 426–432

[56] References Cited

U.S. PATENT DOCUMENTS

| | | | |
|---|---|---|---|
| 1,092,156 | 4/1914 | Mathis | 211/69.1 |
| 3,483,434 | 12/1969 | Koertge | 361/427 |
| 3,606,019 | 9/1971 | Dubiel | 211/26 |

Primary Examiner—Philip H. Leung
Assistant Examiner—Gregory D. Thompson
Attorney, Agent, or Firm—Cahill, Sutton & Thomas

[57] ABSTRACT

A mounting plate for supporting one or more fuse blocks to a telephone equipment bay frame includes a channel-shaped, elongated support member having mounting arms extending from the opposing ends thereof and adapted to be secured to opposing vertically-oriented standards of the bay frame. The central portion of the elongated support member includes a substantially planar surface used to support one or more of various types of fuse blocks. Sixteen pairs of wiring terminal holes are formed within the elongated support member spaced at equal intervals commensurate with the spacing of wiring terminals provided in conventional fuse blocks. Screw mounting holes are also formed in the elongated support member at spaced intervals midway between adjacent pairs of wiring terminal holes and lying along the central axis of the elongated support member for receiving mounting screws used to secure the fuse blocks to the mounting plate. Ground bar apertures are also formed within the elongated support member adjacent the first, fourth, fifth, eighth, ninth, twelfth, thirteenth, and sixteenth pairs of wiring terminal holes for receiving one or more ground bus bars extending from the fuse blocks supported by the mounting plate. The mounting plate is adapted to support one or more 8-pin fuse blocks, one or two 16-pin fuse blocks, or combinations thereof.

11 Claims, 4 Drawing Sheets

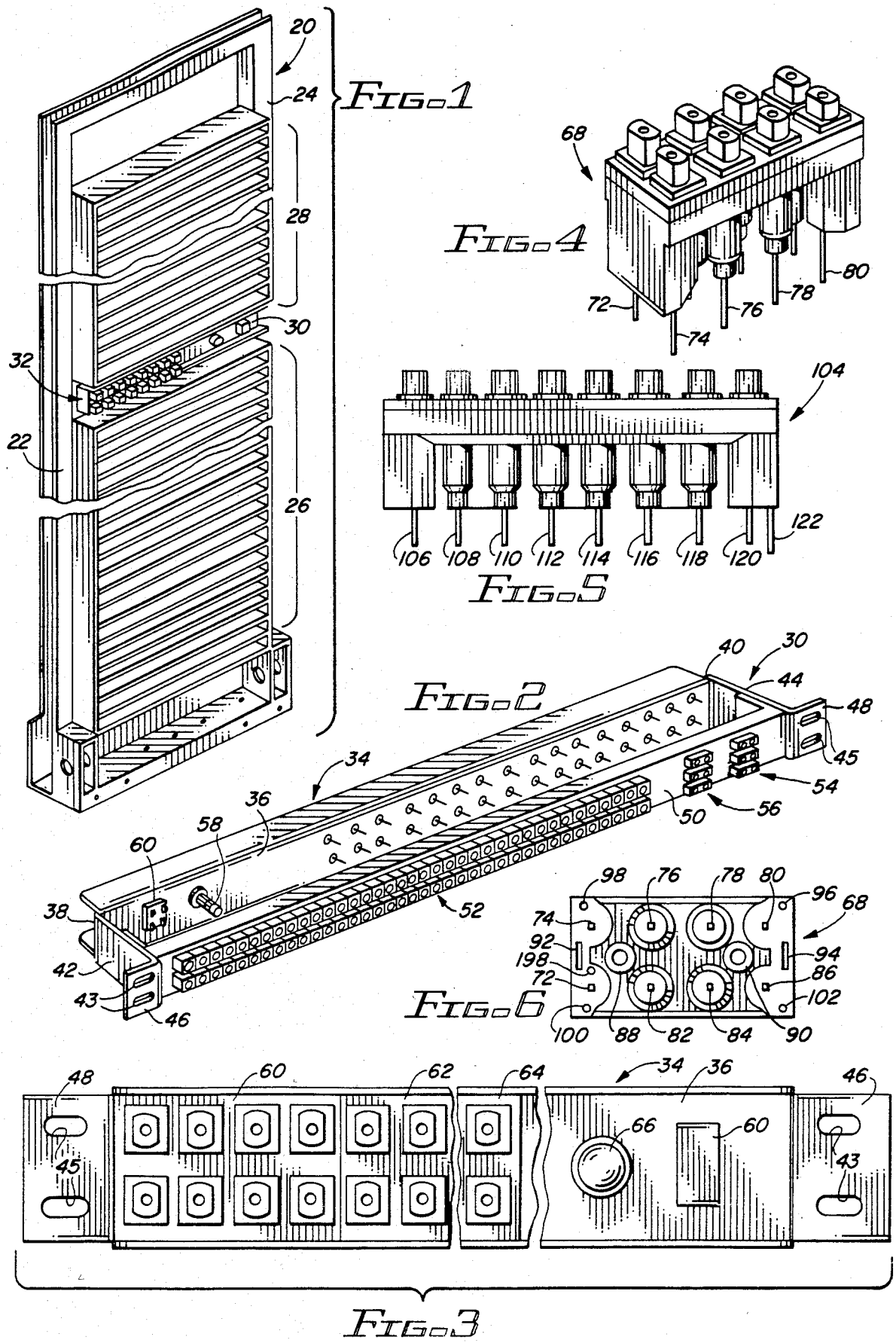

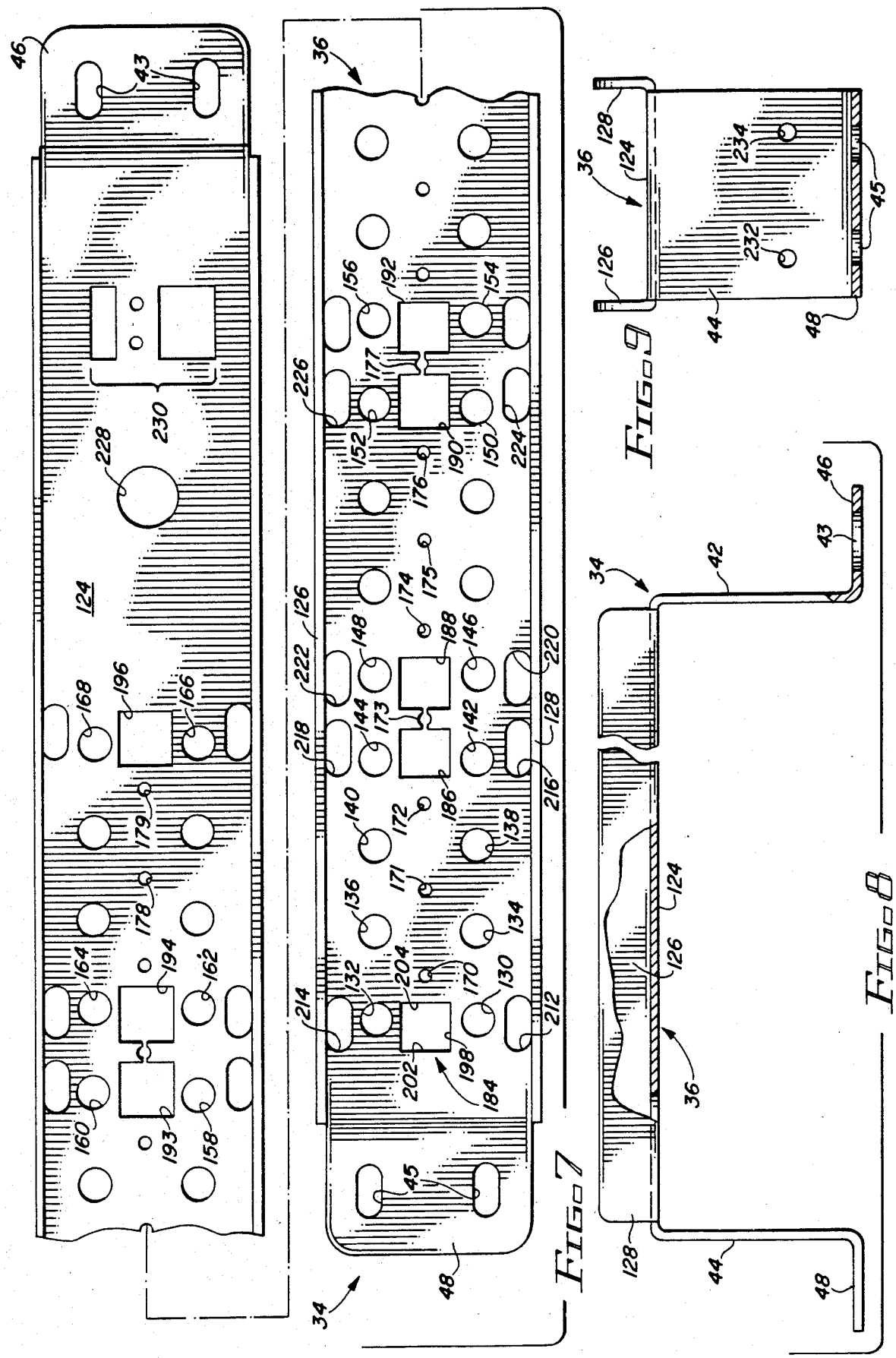

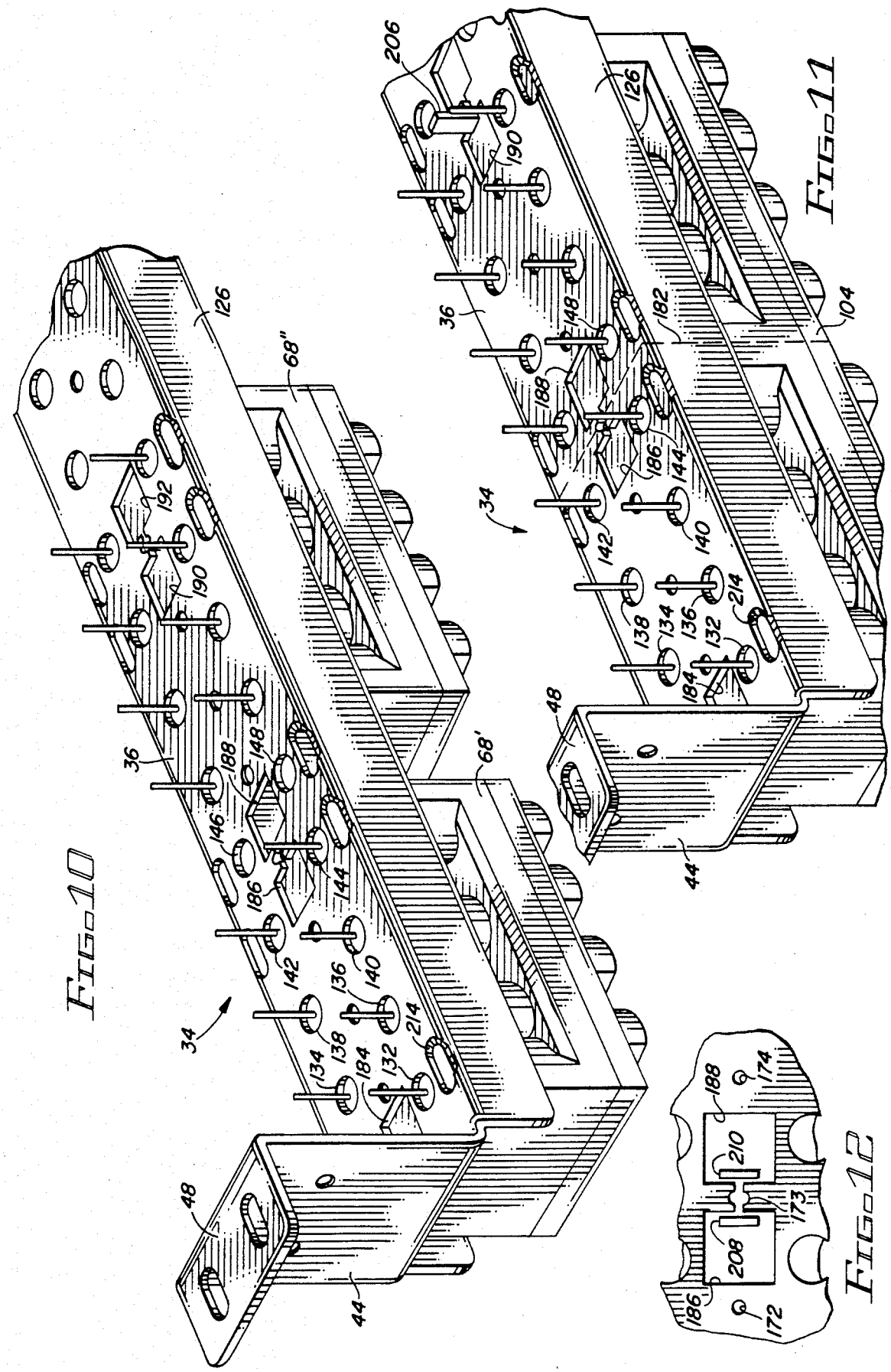

FUSE PANEL MOUNTING PLATE

BACKGROUND OF THE INVENTION

1. Field of the Invention

The present invention relates generally to electrical equipment bays of the type used to support telephone communications equipment within telephone service central offices, and more specifically, to a universal mounting plate for supporting a variety of fuse blocks to an electrical equipment bay frame.

2. Description of the Prior Art

Within telephone service central offices, telephone communications equipment is often supported within bay frame racks. Each of said bay frame racks includes a pair of vertically-oriented standards having holes drilled therein in order to secure mounting plates thereto. Electrical components are installed upon such mounting plates and are interconnected by related wiring to form equipment panels.

One type of such an equipment rack is a maintenance connector bay used for central office testing. Such maintenance connector bays are supplied with fuse panels to provide protection against electrical overload conditions. Such fuse panels have included a variety of fuse blocks adapted to receive replaceable fuses. One type of fuse block in common use is a Model 23A fuse block, commercially available from Western Electric/AT&T, providing eight positions for Type 70 fuses. Another type of fuse block in common use is a Model 22A fuse block commercially available from Western Electric/AT&T, providing 16 positions for Type 70 fuses.

A variety of different fuse panels have been sold in the past making use of one or more of the aforementioned types of fuse blocks. The number and type of fuse blocks which have been used in each instance depends in part upon the capacity of the maintenance connector in which the fuse panel is being installed. Moreover, in some instances, such fuse panels are subdivided into two batteries (battery A and battery B) with separate power and ground connections to each such battery. In such instances, separate ground bus bars extend through the mounting plate for each such fuse panel.

In some instances, mounting plates for such fuse blocks have been designed wherein two consecutive fuse blocks have been positioned relatively close together. In other instances, it is preferred that consecutive fuse blocks be spaced apart from one another somewhat in order to facillitate the connection of wires thereto.

As a result of the foregoing, manufacturers of fuse panels of the type described above have been forced to produce and use a number of different custom designed mounting plates to support the various types and combinations of fuse blocks in order to supply the various types of fuse panels demanded in the industry. Apart from the inconvenience of maintaining an inventory of a great number of differently configured mounting plates, the cost of producing such a variety of mounting plates is considerable.

Accordingly, it is an object of the present invention to provide a universal fuse panel mounting plate adapted to support one or multiple 8-pin fuse blocks to an electrical equipment bay frame.

It is another object of the present invention to provide such a universal mounting plate for mounting single or dual 16-pin fuse blocks to an electrical equipment bay frame.

It is still another object of the present invention to provide such a universal mounting plate to which both 8-pin and 16-pin fuse blocks may be secured in combination with one another.

It is a further object of the present invention to provide such a universal mounting plate which provides for the shifting of the location of a particular fuse block as between one assembled fuse panel and another.

It is still a further object of the present invention to provide such a universal mounting plate which permits consecutive fuse blocks to be positioned adjacent to one another or spaced apart from one another.

These and other objects of the present invention will become more apparent to those skilled in the art as the description of the present invention proceeds.

SUMMARY OF THE INVENTION

Briefly described, and in accordance with one embodiment thereof, the present invention relates to a universal mounting plate for supporting one or more fuse blocks of various types to an electrical equipment bay frame. The mounting plate includes an elongated support member having a substantially planar surface. Mounting arms extend from the ends of the elongated support member for securing the elongated support member to the upright standards of the electrical equipment bay frame.

Formed within the substantially planar surface of the elongated support member are a first series of spaced holes for permitting wiring terminals of the one or more fuse blocks to extend therethrough. The first series of spaced holes are arranged in at least eight pairs, each pair being centered upon a line lying perpendicular to the longitudinal axis of the elongated support member. Each such pair of holes includes a first hole centered on a first line lying parallel to the longitudinal axis of the elongated support member, and a second hole centered on a second line lying parallel to the longitudinal axis of the elongated support member. The pairs of wiring terminal holes are spaced apart from each other at uniform intervals corresponding to the distance between the like pairs of wiring terminals extending from the fuse blocks to be supported by the mounting plate.

The mounting plate of the present invention also includes a series of mounting screw holes formed in the substantially planar surface of the elongated support member for securing the one or more fuse blocks to the mounting plate. The series of mounting screw holes are centered along a line lying parallel to the longitudinal axis of the elongated support member and substantially midway between the first and second holes in each pair of wiring terminal holes. Preferably, such screw mounting holes are provided between each of the pairs of wiring terminal holes in order to allow the mounting plate to support both 8-pin and 16-pin fuse blocks.

Ground bar apertures are also formed within the substantially planar surface of the elongated support member for permitting ground bus bars extending from the fuse blocks to pass therethrough. The ground bar apertures lie centered along the longitudinal axis of the elongated support member, such ground bar apertures being formed proximate to at least one of the first and fourth pairs of wiring terminal holes, and proximate to at least one of the fifth and eight pairs of wiring terminal holes.

Preferably, the elongated support member is channel-shaped and includes side flanges extending from opposing sides of the substantially planar surface perpendicular thereto for extending about the one or more fuse blocks secured to the mounting plate.

In order to facilitate the provision of a space between two consecutive 8-pin fuse blocks, the mounting plate of the present invention preferably includes a ninth pair of wiring terminal holes spaced from the eighth pair by the aforementioned uniform interval. Mounting screw holes are also provided midway between the sixth and seventh pair, and between the eighth and ninth pair of wiring terminal holes for securing an 8-pin fuse block to the mounting plate overlying the sixth, seventh, eighth and ninth pair of wiring terminal holes.

Preferably, the mounting plate of the present invention includes at least 16 pairs of wiring terminal holes spaced at the aforementioned uniform intervals for allowing the mounting plate to support as many as four 8-pin fuse blocks, or two 16-pin fuse blocks. Screw mounting holes are preferably provided between consecutive pairs of wiring terminals holes for securing both 8-pin and 16-pin fuse blocks to the mounting plate at almost any position. Additional ground bar apertures are formed proximate to at least one of the ninth and twelfth pairs of wiring terminal holes, and at least proximate to one of the thirteenth and sixteenth pairs of wiring terminal holes for permitting the passage of ground bus bars extending from fuse blocks overlying the ninth through sixteenth pair of wiring terminal holes.

Supplemental wiring terminal apertures may also be formed in the substantially planar surface of the elongated support member for permitting one or more supplemental wiring terminals from each fuse block to extend therethrough. Such supplemental wiring terminals may be provided, for example, to activate a warning light or trigger an alarm relay should one of the fuses within the fuse block become blown. Such supplemental wiring terminal apertures are disposed substantially between one of the aforementioned wiring terminal holes and the outer edge of the substantially planar surface of the elongated support member. The supplemental wiring terminal apertures are formed proximate to at least one of the first and fourth pairs of wiring terminal holes, and proximate to at least one of the fifth and eighth pairs of wiring terminal holes.

BRIEF DESCRIPTION OF THE DRAWINGS

FIG. 1 is a perspective view of an electrical equipment bay frame in which a mounting plate of the type embodying the present invention has been installed.

FIG. 2 is a telephone communication system fuse and alarm panel of the type installed within the bay frame shown in FIG. 1.

FIG. 3 is a top view of the mounting plate of the present invention having a plurality of fuse blocks supported therein and including an alarm lamp and a relay for triggering a remote alarm.

FIG. 4 is a prespective view of an 8-pin fuse block of a type which may be supported by the mounting plate of FIG. 3.

FIG. 5 is a side view of a 16-pin fuse block of a type which may be supported by the mounting plate of FIG. 3.

FIG. 6 is a bottom view of the fuse block shown in FIG. 4.

FIG. 7 is a top view of the mounting plate shown in FIG. 3 after all electrical components have been removed therefrom.

FIG. 8 is a side view of the mounting plate shown in FIG. 7.

FIG. 9 is an end view of the mounting plate shown in FIGS. 7 and 8.

FIG. 10 is a partial perspective view of the underside of the mounting brace with a pair of 8-pin fuse blocks inserted therein and spaced apart from each other.

FIG. 11 is a partial perspective view of the underside of the mounting brace with a 16-pin fuse block inserted therein.

FIG. 12 is an enlarged view of two adjacent ground bus apertures and two associated ground bus bars.

DESCRIPTION OF THE PREFERRED EMBODIMENTS

Figure 13:
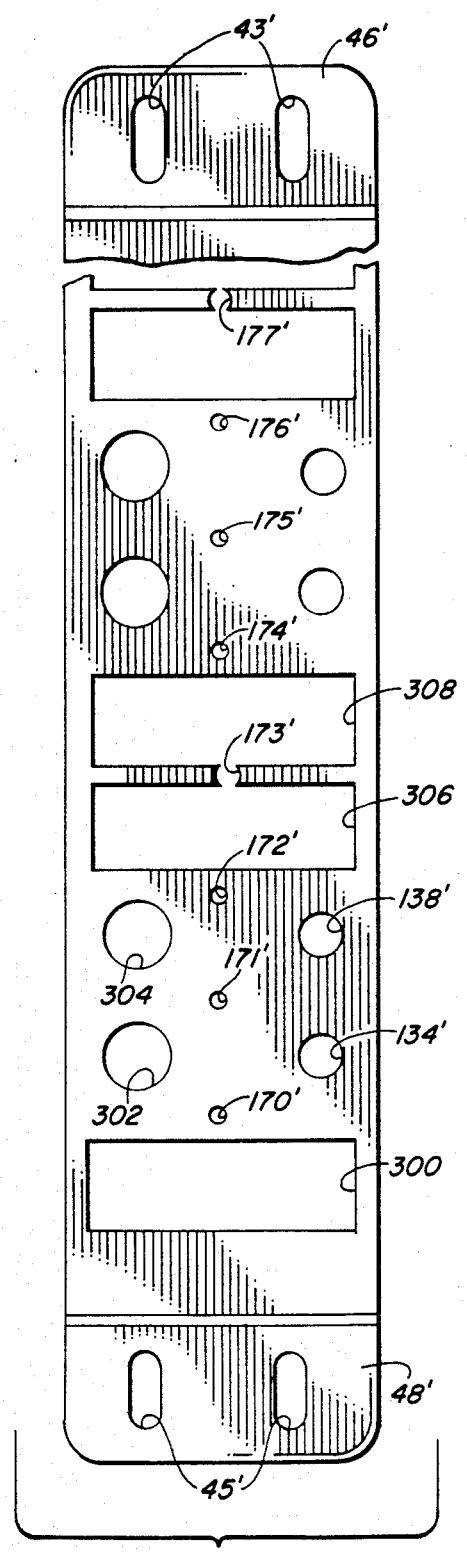
FIG. 13 is a top view of an alternate embodiment of the mounting plate shown in FIG. 7 and capable of supporting Model 23A, Model 22A, and Model 30D fuse blocks.

An electrical equipment bay frame of the type with which the mounting plate of the present invention is used is shown in FIG. 1 and is designated generally by reference numeral 20. An example of such an electrical equipment bay frame is an AT&T Type 4 maintenance connector bay of the type available from AT&T Information Systems in Phoenix, Ariz. Bay frame 20 includes a pair of opposing vertically-oriented standards 22 and 24 for supporting a number of stacked electrical panels designated generally by reference numerals 26 and 28. Positioned between electrical panels 26 and 28 is a fuse and alarm panel 30, including a plurality of fuse blocks designated generally by reference numeral 32.

Fuse and alarm panel 30 is shown, in rear view, in FIG. 2, and includes a mounting plate 34 embodying the present invention. Mounting plate 34 includes a channel-shaped elongated support member 36 having a first end 38 and a second end 40. First and second mounting arms 42 and 44 extend from first and second ends 38 and 40, respectively, of support member 36 for securing the same to upright standards 22 and 24 of bay frame 20. For this purpose, mounting arms 42 and 44 terminate in mounting flanges 46 and 48, respectively, which have holes 43 and 45 formed therein to receive mounting screws that extend into aligned holes in standards 22 and 24.

Also shown in FIG. 2 is a rear bracket 50 secured at its ends to mounting arms 42 and 44. Rear bracket 50 is adapted to support a plurality of barrier terminal strips 52 for electrical interconnection of fuse and alarm panel 30 to other electrical panels. Also visible upon rear bracket 50 are two groups of terminals designated 54 and 56. Terminals 54 are adapted to provide separate battery and ground connections for a Group A of fuses, while terminals 56 are adapted to provide battery and ground for a Group B of fuses.

Visible upon the underside of mounting plate 34 in FIG. 2 are a warning lamp socket 58, the base of a relay 60 used to trigger a remote alarm, as well as a plurality of wiring terminals protruding through patterned holes, as described in greater detail below. For the sake of simplicity and the ease of illustration, the wiring interconnections between the wiring terminals, warning lamp 58, relay 60, and terminals 52, 54 and 56 have been omitted within FIG. 2.

FIG. 3 generally illustrates the appearance of the front of fuse and alarm panel 30 following assembly. Visible within FIG. 3 are three fuse blocks 60, 62, and 64 secured to channel-shaped elongated support member 36 of mounting plate 34. Also visible in FIG. 3 are a warning lamp 66 for indicating a blown fuse, as well as the coil housing for relay 60.

As mentioned above, one common type of fuse block used to construct a fuse panel is a 23A fuse block providing eight positions for receiving 70 Type fuses. Such fuse blocks are commercially available from AT&T/Western Electric. Such an 8-pin fuse block is shown in FIG. 4 and is designated generally by reference numeral 68. A series of eight metal pins, or wire-wrap terminals, including those designated as 72, 74, 76, 78, and 80 extend downwardly from the bottom of fuse blocks 68 to allow for electrical interconnection to each of the fuses positioned therein. Referring to the bottom view of fuse block 68 shown in FIG. 6, wirewrap terminals 72–80 are shown, along with wirewrap terminals 82, 84 and 86. Wirewrap terminals 72, 82, 84 and 86 are spaced at uniform intervals, as are terminals 74, 76, 78 and 80. Terminals 72 and 74 are centered about a line lying perpendicular to the longitudinal axis of fuse block 68, as are terminal pairs 76 and 82, 78 and 84, and 80 and 86.

Also visible in FIG. 6 are a pair of screw receiving holes 88 and 90 adapted to receive the threaded, tapered end of a mounting screw for securing fuse block 68 to a mounting plate. Also visible in FIG. 6 are a pair of slots 92 and 94 each adapted to receive a ground bus bar for providing a common ground connection for the fuses positioned within fuse block 68. Also visible in FIG. 6 are a plurality of supplemental wiring terminal holes 96, 98, 100 and 102 into which may be inserted a wiring pin for establishing a further electrical connection with fuse block 68. Such supplemental wiring pins might be used, for example, to establish electrical interconnection between each of the fuse blocks and warning lamp socket 58 and the base of remote alarm relay 60.

As mentioned above, fuse blocks are also available which are capable of holding 16 fuses, and will be referred to herein as 16-pin fuse blocks. Such 16-pin fuse blocks are commercially available from AT&T/Western Electric under the model designation 22A, such fuse blocks providing 16 positions of 70 Type fuses. Such a 16-pin fuse block is shown in FIG. 5 designated generally by reference numeral 104. A first row of eight wiring terminals, or wirewrap pins, are shown as 106, 108, 110, 112, 114, 116, 118, and 120. A second row of eight wiring terminals (not shown) lie behind those illustrated in FIG. 5. Like fuse block 68, wiring terminals 106–120 are spaced from each other at uniform intervals. Also like fuse block 68, fuse block 104 shown in FIG. 5 includes a series of regularly spaced screw receiving holes (not shown) for receiving fastening screws used to secure fuse block 104 to a mounting frame. However, the screw hole pattern for fuse block 104 differs from that used for fuse block 68. For example, instead of having a screw receiving hole disposed between the first and second pair of wiring terminals (i.e., between wiring terminals 74 and 76) as for fuse block 68, fuse block 104 has a screw receiving hole between the second and third pair of wiring terminals (i.e., between wiring terminals 108 and 110). This is one reason why a mounting plate specifically designed to support two 8-pin fuse blocks positioned end-to-end would not also support one 16-pin fuse block.

Also, like fuse block 68, fuse block 104 is provided at its ends with slotted ground bus apertures into which a ground bus bar may be extended for providing a common ground connection to each such fuse. A ground bus bar 122 is shown extending from the rightmost end of fuse block 104.

It will be recalled that an object of the present invention is to provide a universal mounting plate adapted to support either of the above-described types of fuse blocks, either singly, in tandem, or in combination with one another. To this end, mounting plate 34 will now be described in greater detail with reference to FIGS. 7–12.

As shown in FIGS. 7–9, mounting plate 34 includes a channel-shaped elongated support member 36 including a subtantially planar central surface 124 and a pair of side flanges 126 and 128. The distance separating side flanges 126 and 128, and hence the width of the channel, is commensurate with the width of fuse blocks 68 and 104 (see FIGS. 4 and 5).

In order to permit the wiring terminals of the fuse blocks supported by mounting plate 34 to extend through the mounting plate in the manner shown in FIGS. 10 and 11, a first series of spaced holes are formed within substantially planar surface 124 of support member 36. Within the preferred embodiment of the present invention, a total of 32 such wiring terminal holes are provided, arranged in 16 pairs of such holes. The first such pair of holes includes holes 130 and 132. The second pair of holes includes holes 134 and 136. The third pair of holes includes holes 138 and 140, and the fourth pair of holes includes holes 142 and 144. Similarly, a fifth pair of holes includes holes 146 and 148, an eighth pair of holes includes holes 150 and 152, and a ninth pair of holes includes holes 154 and 156. A twelfth pair of holes includes holes 158 and 160, a thirteenth pair of holes includes holes 162 and 164, and a sixteenth pair of holes includes holes 166 and 168.

Each of the above-described pairs of wiring terminal holes is centered upon a line lying perpendicular to the longitudinal axis of support member 36. Wiring terminal holes 130, 134, 138, 142, 146, 150, 154, 158, 162 and 166 are all centered upon a first line lying parallel to the longitudinal axis of support member 36; similarly, holes 132, 136, and the second holes in each of the remaining pairs of wiring terminal holes are centered on a second line lying parallel to the longitudinal axis of support member 36. Holes 130 and 132 are spaced on centers corresponding to the distance between wiring terminals 72 and 74 of fuse block 68 (see FIGS. 4 and 6). Similarly, the first pair, second pair, third pair, and remaining pairs of wiring terminal holes are spaced apart from one another at equal intervals corresponding to the distance between wiring terminal 74 and 76 of fuse block 68 (see FIG. 4). Because the wiring terminals of 16-pin fuse block 104 (see FIG. 5) are spaced apart from one another at the same uniform intervals as used for 8-pin fuse block 68 (see FIG. 4), the wiring terminal holes formed in support member 36 are equally adapted to receive the wiring terminals of either or both fuse blocks 68 and 104.

Referring to FIG. 7, a second series of spaced holes is formed within substantially planar surface 124 of support member 36 to permit fastening screws to be extended therethrough for securing one or more fuse blocks within support member 36. These screw mounting holes total 15 in number and include those holes designated by reference numerals 170–179. Screw receiving holes 170–179 are all centered upon a line lying parallel to the longitudinal axis of support member 36 and essentially centered within the channel thereof. Each such screw receiving hole is located substantially midway between four surrounding wiring terminal holes. For example, screw receiving hole 170 is located substantially at the intersection of diagonal lines extending through the centers of holes 130 and 136 and through the centers of holes 132 and 134. By including at least hole 170 between the first and second pair of wiring terminal holes, hole 172 between the third and fourth pair of wiring terminal holes, hole 174 between the fifth and sixth pair of wiring terminal holes, and hole 176 between the seventh and eighth pair of wiring terminal holes, mounting plate 34 may be used to support either one fuse block of the type shown in FIG. 4 or two such fuse blocks positioned end-to-end in tandem. By further adding hole 171 between the second and third pair of wiring terminal holes, hole 173 between the fourth and fifth pair of wiring terminal holes, and hole 175 between the sixth and seventh pair of wiring terminal holes, mounting plate 34 is further adapted to support a 16-pin fuse block of the type shown in FIG. 5.

Referring briefly to FIG. 11, mounting plate 34 is shown with 16-pin fuse block 104 attached thereto, and with the aforementioned wiring terminals extending through the corresponding wiring terminal holes formed in channel-shaped support member 36. The dashed lines designated by reference numeral 182 in FIG. 11 indicate that two 8-pin fuse blocks could also be inserted in tandem in substitution for 16-pin fuse block 104, wherein dashed line 182 serves to indicate the division between the first 8-pin fuse block and the second 8-pin fuse block.

As mentioned above, both 8-pin and 16-pin fuse blocks are provided with ground bus bar slots adapted to receive a ground bus bar, and a provision must be made within mounting plate 34 allowing such ground bus bars to extend therethrough. Accordingly, a series of ground bar apertures are formed in substantially planar surface 124 of support member 36 for this purpose, the ground bar apertures including those designated by reference numerals 184, 186, 188, 190, 192, 193, 194, and 196. As shown in FIG. 7, ground bar aperture 184 is square in shape and extends laterally between edges 198 and 200. The lateral width of ground bar aperture 184 is designed to be slightly larger than the width of ground bus bars of the type adapted to be inserted within slots 92 and 94 of fuse block 68 (see FIG. 6). Ground bar aperture 184 extends longitudinally between edges 202 and 204. Edges 202 is set back a sufficient distance from the center of holes 130 and 132 to ensure that a ground bus bar passing through aperture 184 will not contact and electrically short against support member 36. Edge 204 is shown as extending commensurate with the rightmost perimeters of holes 130 and 132. Edge 204 is extended to that point to facilitate the further passage of yet another terminal through support member 36. Referring briefly to FIG. 6, it will be noted that a circular hole 198 is provided, which hole is adapted to receive an optional wiring terminal extending from fuse block 68. By squaring off the shape of the ground bar apertures as described above, passage of the additional wiring terminal inserted within hole 198 of fuse block 68 is facilitated.

Still referring to FIG. 7, ground bar aperture 184 is shown having been formed substantially between holes 130 and 132, i.e., between the first pair of wiring terminal holes. Similarly, ground bar aperture 186 lies substantially between the fourth pair of wiring terminal holes 142 and 144. Similarly, ground bar apertures 188 and 190 lie substantially between the fifth and eighth pair of wiring terminal holes. Referring to FIG. 11, if a single 16-pin fuse block 104 is supported overlying the first eight pairs of wiring terminal holes, then a ground bus bar may extend from fuse block 104 through either ground bar apertures 184 or 190. FIG. 11 illustrates such a ground bus bar 206 extending through ground bar aperture 190. Alternatively, if two 8-pin fuse blocks 68 are substituted in place of 16-pin fuse block 104 in FIG. 11, then a ground bus bar may extend through either ground bar apertures 184 or 186 for the first fuse block, and through ground bar apertures 188 or 190 for the second fuse block. For example, within FIG. 12, a first ground bus bar 208 is shown extending through ground bar aperture 186 for a first 8-pin fuse block, while a second ground bus bar 210 is shown extending through ground bar aperture 188 for a second 8-pin fuse block. As further shown in FIG. 12, ground bar apertures 186 and 188 and screw receiving hole 173 can be stamped from support member 36 to be contiguous with one another.

Within FIG. 11, only one 16-bit fuse block (or alternatively, only two 8-pin fuse blocks) are shown. However, it should be obvious to those skilled in the art that the ninth pair of wiring terminal holes 154 and 156 through the sixteenth pair of wiring terminal holes 166 and 168 permit the insertion of a second 16-pin fuse block (or alternatively, two additional 8-pin fuse blocks). It should also be evident that mounting plate 34 will permit the installation of a 16-pin fuse block in combination with one or two 8-pin fuse blocks.

As mentioned above, it may sometimes be desirable to mount two or more fuse blocks upon mounting plate 34 with a gap therebetween to ease the task of attaching interconnecting wires thereto. Mounting plate 34 is designed to facilitate supporting two or more consecutive fuse blocks with a space therebetween, as shown in FIG. 10. Within FIG. 10, a first 8-pin fuse block 68' is shown with its wiring terminals extending through the first four pairs of wiring terminal holes in mounting plate 34. A second 8-pin fuse block 68" is shown supported by mounting plate 34 with its wiring terminals extending through the sixth through ninth pairs of wiring terminal holes in mounting plate 34.

Referring again to FIG. 6, it will be recalled that fuse block 68 is provided with supplemental wiring terminal holes 96, 98, 100, and 102 which may optionally receive a further wiring terminal, as for example, to be interconnected with the warning lamp 66 or remote alarm relay 60. Accordingly, a series of supplemental wiring terminal apertures are formed in substantially planar surface 124 of support member 36 for permitting such supplemental wiring terminals to extend therethrough from an associated fuse block. Within FIG. 7, such supplemental wiring terminal apertures are designated by reference numerals 212, 214, 216, 218, 220, 222, 224 and 226. Each such supplemental wiring terminal aperture is disposed substantially between a wiring terminal hole, such as 130, and an outer edge of substantially planar surface 124, as represented for example by the juncture of surface 124 and flange 128. By providing at least one such supplemental wiring terminal aperture proximate to at least the first or fourth pair of wiring terminal holes and another such supplemental wiring terminal aperture proximate to at least the fifth or eighth pair of wiring terminal holes, such a supplemental wiring terminal can be accommodated whether mounting plate 34 is used to support 8-pin or 16-pin fuse blocks.

Within FIG. 7, the large circular hole 228 is provided to mount warning lamp socket 58, while the combination of holes designated by reference numeral 230 are provided to mount the base of relay 60. Within FIG. 9, holes 232 and 234 are provided in support arm 42 to attach the same to one end of rear bracket 50.

FIG. 13, illustrates an alternate embodiment of a universal fuse block mounting plate capable of supporting Model 23A and Model 22A fuse blocks, but in addition also being capable of supporting Model 30D fuse blocks. The latter type of fuse blocks have eight fuse positions, four of which are 70 Type fuses, but the remaining four of which are heavier duty fuse. The wiring terminals extending from Model 30D fuse blocks are of larger dimension for the heavier duty fuses, thereby requiring a larger hole within the mounting plate in order for such wiring terminals to extend there through.

Referring to FIG. 13, those features of the mounting plate shown therein which are in common with the features shown in FIG. 7, are referenced by like primed reference numerals. Rectangular slot 300 takes the place of wiring terminal holes 130 and 132, ground bar aperture 184, and supplemental wiring apertures 212 and 214 shown in FIG. 7. Screw receiving holes 170', 171', 172', 173', and 174' are positioned in the same locations as for mounting plate 34 in FIG. 7. Wiring terminal holes 134' and 138' are located in the same positions as corresponding wiring terminal holes 134 and 138 in FIG. 7. However, wiring terminal holes 302 and 304 take the place of former wiring terminal holes 136 and 140, and are of a larger diameter in order to permit the larger wiring terminals of the Model 30D fuse block to extend there through. Rectangular aperture 306 is substituted within the mounting plate shown in FIG. 13 in place of wiring terminal holes 142 and 144, ground bar aperture 186, and supplemental wiring terminal holes 216 and 218 shown in FIG. 7. Similarly, rectangular aperture 308 in FIG. 13 takes the place of those holes and apertures designated in FIG. 7 by reference numerals 146, 148, 188, 220, and 222.

Those skilled in the art will appreciate that the alternate mounting plate shown in FIG. 13 is capable of supporting all of the combinations of fuse blocks previously described with respect to mounting plate 34 in FIG. 7, but is additionally capable of supporting up to four consecutive Model 30D fuse blocks.

The mounting plate described herein may be made from metal and can be produced using standard metal forming and metal stamping methods. Those skilled in the art will now appreciate that a universal mounting plate has been described capable of supporting a variety of fuse block combinations to an electrical equipment bay frame, thereby eliminating the need to produce and stock a great number of customized fuse panel mounting plates. While the present invention has been described in accordance with a preferred embodiment thereof, the description is for illustrative purposes only and should not be construed as limiting the scope of the invention. Various changes and modifications may occur to those skilled in the art without departing from the true spirit and scope of the invention as defined by the appended claims.

I claim:

1. A mounting plate for supporting one or more fuse blocks to an electrical equipment bay frame, said mounting plate comprising in combination:
   a. an elongated support member having a substantially planar surface and having first and second ends;
   b. first and second mounting arms extending from the first and second ends, respectively, of said elongated support member for securing said elongated support member to opposing vertically-oriented standards of an electrical equipment bay frame;
   c. said elongated support member including:
      i. a plurality of spaced terminal-receiving holes formed in the substantially planar surface of said elongated support member for permitting wiring terminals of a fuse block supported by said mounting plate to extend therethrough, said plurality of terminal-receiving holes being arranged in pairs, each pair of terminal-receiving holes being centered upon a line lying perpendicular to a longitudinal axis of said elongated support member, a first hole in each said pair being centered on a first line lying parallel to the longitudinal axis of said elongated support member, and a second hole in each said pair being centered on a second line lying parallel to the longitudinal axis of said support member, said pairs of terminal-receiving holes being spaced apart at equal intervals, the distance of each such interval corresponding to the distance between the wiring terminals extending from the fuse blocks to be supported by said mounting plate, said plurality of terminal-receiving holes including at least 8 such pairs of terminal-receiving holes;
      ii. a plurality of spaced screw-receiving holes formed in the substantially planar surface of said elongated member and adapted to receive mounting screws for securing a fuse block to said mounting plate, said plurality of screw-receiving holes being centered upon a line lying parallel to the longitudinal axis of said elongated support member and substantially midway between the first and second holes in each said pair of said plurality of terminal-receiving holes, said plurality of screw-receiving holes including mounting screw receiving holes lying substantially midway between at least a first and second pair, a third and fourth pair, the fourth and a fifth pair, the fifth and a sixth pair, and a seventh and eighth pair of said plurality of terminal-receiving holes; and
      iii. a plurality of ground bar apertures formed in the substantially planar surface of said elongated support member and adapted to receive a ground bus bar extending from a fuse block, each of said ground bar apertures lying substantially between the first and second holes of one of said pairs of terminal-receiving holes, said plurality of ground bar apertures including at least a first ground bar aperture formed proximate the fourth pair of terminal-receiving holes on a first side of and adjacent to the screw-receiving hole lying between said fourth and fifth pairs of terminal-receiving holes, and including at least a second ground bar aperture formed proximate the fifth pair of terminal-receiving holes on a second side of and adjacent to the screw-receiving hole lying between said fourth and fifth pairs of terminal-receiving holes.

2. A mounting plate as recited in claim 1 wherein said elongated support member is channel-shaped, said substantially planar surface forming the center of the channel, said elongated support member including a pair of side flanges extending from opposing sides of said substantially planar surface substantially perpendicular thereto, the channel having a width commensurate with the width of fuse blocks supported by said mounting plate.

3. A mounting plate as recited by claim 1 wherein:
 a. said plurality of terminal-receiving holes includes a ninth pair of terminal-receiving holes;
 b. said plurality of screw-receiving holes includes mounting screw receiving holes lying substantially midway between the sixth and seventh pair and between the eighth and ninth pair of said plurality of terminal-receiving holes; and
 c. said plurality of ground bar apertures includes a third ground bar aperture formed proximate to the eighth pair of terminal-receiving holes on a first side of and adjacent to the screw-receiving hole lying between said eighth and ninth pairs of terminal-receiving holes, and a fourth ground bar aperture formed proximate to the ninth pair of terminal-receiving holes on a second side of and adjacent to the screw-receiving hole lying between said eighth and ninth pairs of terminal-receiving holes.

4. A mounting plate as recited by claim 1 wherein:
 a. said plurality of terminal-receiving holes includes at least 16 pairs of said terminal-receiving holes;
 b. said plurality of screw-receiving holes includes mounting screw-receiving holes lying substantially midway between at least a ninth and tenth pair, an eleventh and twelfth pair, the twelfth and a thirteenth pair, the thirteenth pair and fourteenth pair, and a fifteenth and sixteenth pair of said plurality of terminal-receiving holes; and
 c. said plurality of ground bar apertures including a third ground bar aperture formed proximate the twelfth pair of said terminal-receiving holes on a first side of and adjacent to the screw-receiving hole lying between said twelfth and thirteenth pairs of terminal receiving holes, and a fourth ground bar aperture formed proximate the thirteenth pair of said terminal-receiving holes, on a second side of and adjacent to the screw-receiving hole lying between said twelfth and thirteenth pairs of terminal-receiving holes.

5. A mounting plate as recited by claim 1 including a plurality of supplemental wiring terminal apertures formed in the substantially planar surface of said elongated support member for permitting a supplemental wiring terminal of a fuse block to extend therethrough, each of said supplemental wiring terminal apertures being disposed substantially between one of said plurality of terminal-receiving holes and an outer edge of the substantially planar surface of said elongated support member, said plurality of supplemental wiring terminal apertures including at least a first such aperture proximate one of the first and fourth and fourth pairs of said plurality of terminal-receiving holes, and including at least a second such aperture proximate to one of the fifth and eighth pairs of said plurality of terminal-receiving holes.

6. A mounting plate as recited by claim 1 including mounting screw receiving holes lying substantially midway between the second and third pair, and the sixth and seventh pair of said plurality of terminal-receiving holes to mount a 16-pin fuse block to said mounting plate.

7. In combination, at least one fuse block and a mounting plate for supporting said fuse block within an electrical equipment bay frame, comprising:
 a. a fuse block adapted to receive a plurality of replaceable fuses, said fuse block including a plurality of wiring terminals extending therefrom, said plurality of wiring terminals being arranged in pairs uniformly spaced apart from one another and including at least four such pairs of wiring terminals, said fuse block further including at least two screw-receiving holes each adapted to receive the threaded end of a mounting screw and each lying midway between two adjacent pairs of said wiring terminals, said fuse block further including at least one slot at an end thereof for receiving a ground bus bar providing a common ground connection for fuses received within said fuse block; and
 b. a mounting plate including an elongated support member having a substantially planar surface and having first and second ends, and including first and second mounting arms extending from the first and second ends, respectively, of said elongated support member for securing said elongated support member to opposing vertically-oriented standards of an electrical equipment bay frame;
 c. said elongated support member of said mounting plate including:
  i. a plurality of spaced terminal-receiving holes formed in the substantially planar surface of said elongated support member through which said wiring terminals of said fuse block extend, said plurality of terminal-receiving holes being arranged in pairs, each pair of terminal-receiving holes being centered upon a line lying perpendicular to a longitudinal axis of said elongated support member, a first hole in each said pair being centered on a first line lying parallel to the longitudinal axis of said elongated support member, and a second hole in each said pair being centered on a second line lying parallel to the longitudinal axis of said support member, said pairs of terminal-receiving holes being spaced apart at equal intervals, the distance of each such interval corresponding to the distance between said wiring terminals extending from said fuse block, said plurality of terminal-receiving holes including at least 8 such pairs of terminal-receiving holes;
  ii. a plurality of spaced screw-receiving holes formed in the substantially planar surface of said elongated member and adapted to receive mounting screws for securing said fuse block to said mounting plate, said plurality of screw-receiving holes being centered upon a line lying parallel to the longitudinal axis of said elongated support member and substantially midway between the first and second holes in each said pair of said plurality of terminal-receiving holes, said plurality of screw-receiving holes including mounting screw receiving holes lying substantially midway between at least a first and second pair, a third and fourth pair, a fifth and a sixth pair, and a seventh and eighth pair of said plurality of terminal-receiving holes; and iii. a plurality of ground bar apertures formed in the substantially planar surface of said elongated support member and adapted to receive a ground bus bar extending from said fuse block, each of said ground bar apertures lying substantially between the first and second holes of one of said pairs of terminal-receiving holes, said plurality of ground bar apertures including at least a first ground bar aperture formed proximate one of the first and fourth pairs of terminal-receiving holes, and including at least a second ground bar aperture formed proximate one of the fifth and eighth pairs of terminal-receiving holes.

8. The combined recited by claim 7 wherein said elongated support member is channel-shaped, said substantially planar surface forming the center of the channel, said elongated support member including a pair of side flanges extending from opposing sides of said substantially planar surface substantially perpendicular thereto, the channel having a width commensurate with the width of said fuse block supported by said mounting plate.

9. The combined recited by claim 7 wherein:
   a. said plurality of terminal-receiving holes includes a ninth pair of terminal-receiving holes;
   b. said plurality of screw-receiving holes includes mounting screw receiving holes lying substantially midway between the sixth and seventh pair and between the eighth and ninth pair of said plurality of terminal-receiving holes; and
   c. said plurality of ground bar apertures includes a third ground bar aperture formed proximate to the ninth pair of terminal-receiving holes.

10. The combination recited by claim 7 wherein:
    a. said plurality of terminal-receiving holes includes at least 16 pairs of said terminal-receiving holes;
    b. said plurality of screw-receiving holes includes mounting screw-receiving holes lying substantially midway between at least a ninth and tenth pair, an eleventh and twelfth pair, a thirteenth pair and fourteenth pair, and a fifteenth and sixteenth pair of said plurality of terminal-receiving holes; and
    c. said plurality of ground bar apertures including at least a third ground bar aperture formed proximate one of the ninth and twelfth pairs of said terminal-receiving holes, and at least a fourth ground bar aperture formed proximate one of the thirteenth and sixteenth pairs of said terminal-receiving holes.

11. The combination recited by claim 7 wherein:
    a. said fuse block has 16 wiring terminals arraged as 8 pairs of such wiring terminals; and
    b. said plurality of screw-receiving holes within said mounting plate includes mounting screw receiving holes lying substantially midway between the second and third pair, the fourth and fifth pair, and the sixth and seventh pair of terminal-receiving holes to secure said fuse block to said mounting plate.

* * * * *